(12) United States Patent
Hwan (10) Patent No.: US 7,137,723 B2
(45) Date of Patent: Nov. 21, 2006

(54) WINDSHIELD WIPER DECORATION LIGHT

(75) Inventor: Robin Hwan, Hsichih (TW)

(73) Assignee: Great Performance Industries Co., Ltd., Taipei Hsien (TW)

( * ) Notice: Subject to any disclaimer, the term of this patent is extended or adjusted under 35 U.S.C. 154(b) by 74 days.

(21) Appl. No.: 10/892,201

(22) Filed: Jul. 16, 2004

(65) Prior Publication Data

US 2006/0013010 A1    Jan. 19, 2006

(51) Int. Cl.
*B60Q 1/26* (2006.01)

(52) U.S. Cl. ............. 362/503; 362/545; 15/250.001

(58) Field of Classification Search ........... 362/508, 362/808, 464, 644, 656, 540, 800, 806, 84, 362/253, 503, 545; 15/250.001, 257.01
See application file for complete search history.

(56) References Cited

U.S. PATENT DOCUMENTS 5,276,937 A * 1/1994 Lan ................. 15/257.01
5,278,732 A * 1/1994 Frankum ............. 362/473
6,149,288 A * 11/2000 Huang ............... 362/545
6,170,968 B1 * 1/2001 Caswell .............. 362/469
6,334,692 B1 * 1/2002 Hsueh ................ 362/116
6,681,441 B1 * 1/2004 Charng .............. 15/257.01
6,742,913 B1 * 6/2004 Deutsch ............. 362/253

* cited by examiner

Primary Examiner—Renee Luebke
Assistant Examiner—Zahra I. Bennett
(74) Attorney, Agent, or Firm—Leong C. Lei (57) ABSTRACT

A decoration light for windshield wiper which includes a windshield wiper press-in plate with an elongated opening, a decoration light element, a base, a waterproof rubber strip, and a circuit module. The decoration light element includes a see-through top. The base containing at its center a trough to receive the circuit module. The circuit module contains an IC, a vibration switch, a light sensitive element and LEDs. The top and the base are respectively inserted to the opening. When the windshield wiper is activated, the LEDs will flash with a given intermission during night hours.

4 Claims, 10 Drawing Sheets

WINDSHIELD WIPER DECORATION LIGHT

BACKGROUND OF THE INVENTION (a) Technical Field of the Invention

The present invention is related to a windshield wiper decoration light, and more particularly, to one that adapted to the windshield wiper press-in plate or elsewhere on the body of the vehicle for adding flash decoration interest.

(b) Description of the Prior Art

As the car becomes a popular transportation means in the modern life, many drivers are paying more attention on the decoration items exclusively designed for the vehicle. Diversified flash decoration items have flooded the automobile parts market. However, most of them are basically designed with reflection sheets lacking any change of appearance, and particularly so for those pertaining to the windshield wiper.

SUMMARY OF THE INVENTION

The primary purpose of the present invention is to provide a windshield wiper decoration light adapted to the body of the vehicle either by adhesion or by clip also for drive safety purpose that flares with a given length of intermission during night hours when the windshield wiper is activated. To achieve the purpose, the present invention includes a press-in plate with an elongated opening, and a decoration light element comprised of a see-through top, a base containing at its center a trough to receive a circuit modulus, and a waterproof rubber strip. The circuit modulus contains an IC, a vibration switch, a light sensitive element and an LED. The top and the base are respectively inserted to the opening provided on the press-in plate. The waterproof rubber strip is sandwiched between the top and the base for the decoration light to be fixed to the press-in plate. Once the windshield wiper is activated, the LED is lighted as induction by the light sensible element and the vibration switch.

The same decoration and safety display effects can be also achieved by having the circuit modulus removed, and reflector sheet or paper is adhered onto the top of the present invention.

Furthermore, the top may be made in various shapes, and the base may be extended from its both sides and also made in various shapes for the present invention to be adhered to anywhere on the body or on the edge of the door.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
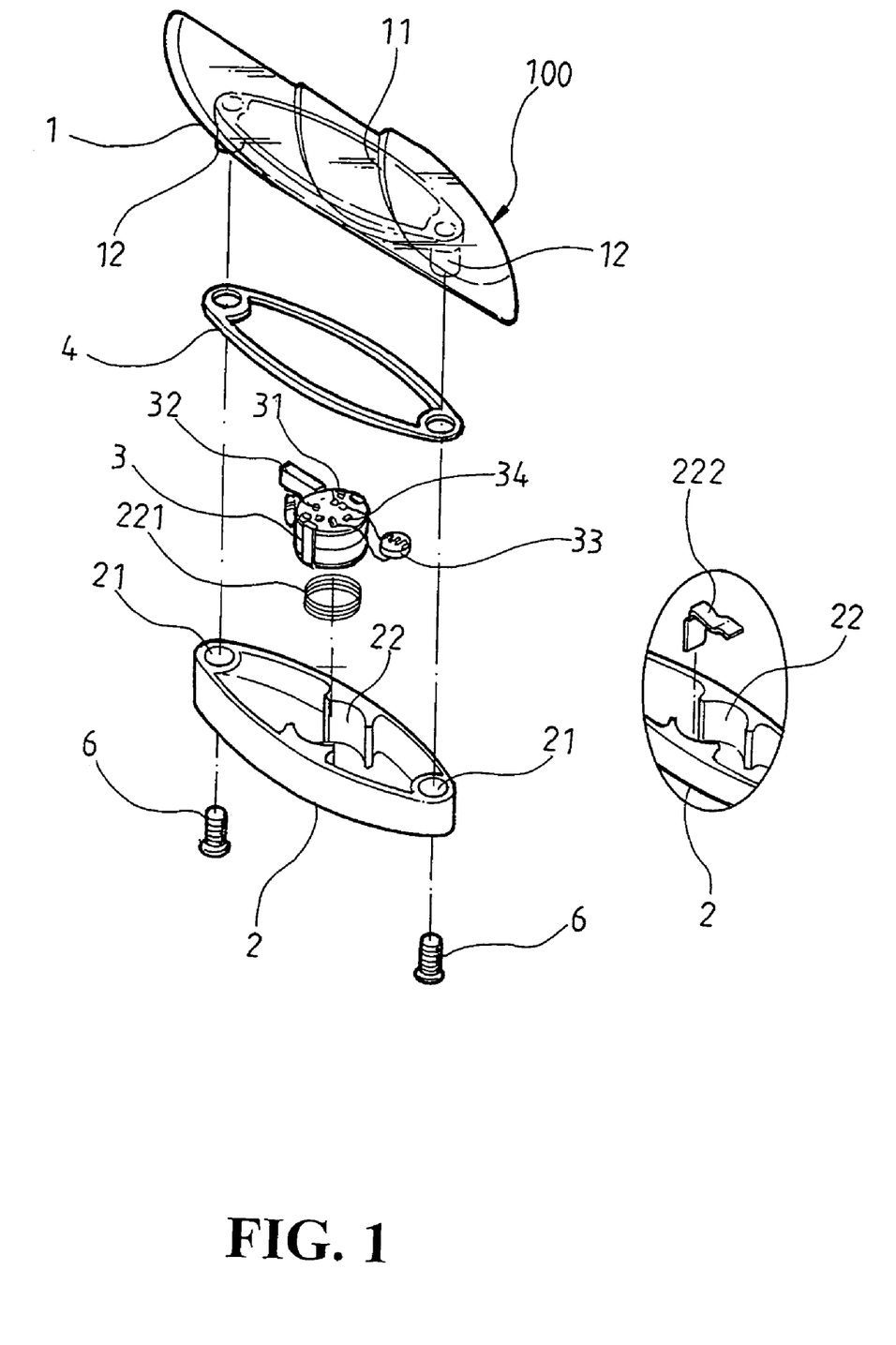
FIG. 1 is an exploded view of a first preferred embodiment of the present invention.
Figure 2:
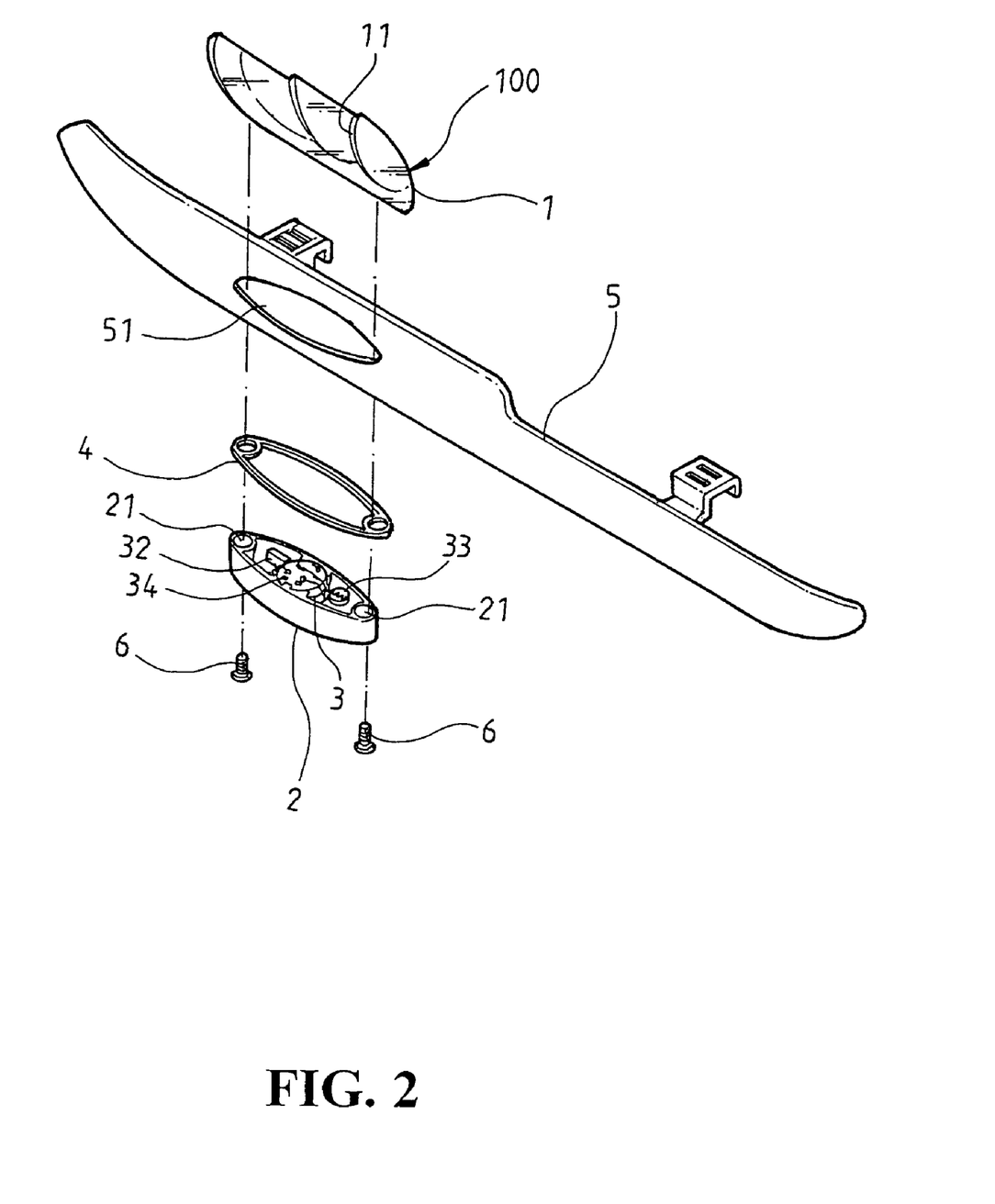
FIG. 2 is an exploded view showing the first preferred embodiment of the present invention is mounted to a windshield wiper press-in plate.
Figure 3:
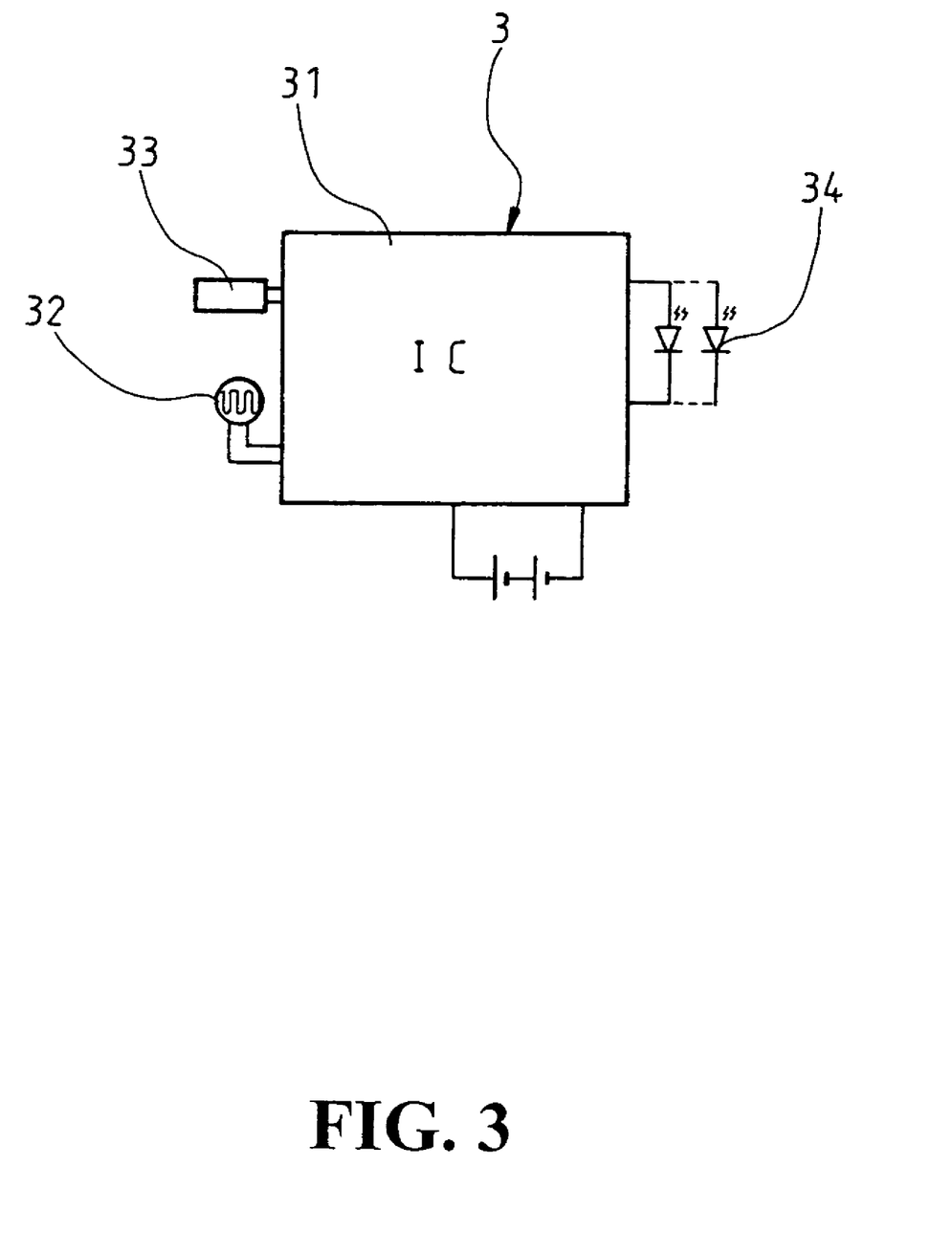
FIG. 3 is a block chart of a circuit modulus of the present invention.

Referring to FIGS. 1, 2, and 3, a first preferred embodiment of the present invention is essentially comprised of a windshield wiper press-in plate 5, an elongated opening 51 in the press-in plate 51, and a decoration light element 100 including a top 1, a base 2, a circuit module 3 and a waterproof rubber strip 4. Wherein, the top 1 of the decoration light element 100 is made see-through, disposed on its surface multiple arc graded marks 11, and two fixation studs 12 being each provided on both sides at the bottom of top 1.

The base 2 which is in its size slightly smaller than that of the top 1 is provided at each of its both ends with a through hole 21, a trough 22 at the center of the base 2, and a coil 221 or an reed 222 disposed inside the trough 22.

The circuit module 3 contains an IC 31 connected to a vibration switch 32 and a light sensitive element 33, and a light emitting diode (LED) 34 or multiple LEDs in different colors. When the circuit module 3 is placed in the trough 22, the coil 221 or the reed 222 further intensifies the rocking extent of the circuit module 3.

Figure 4:
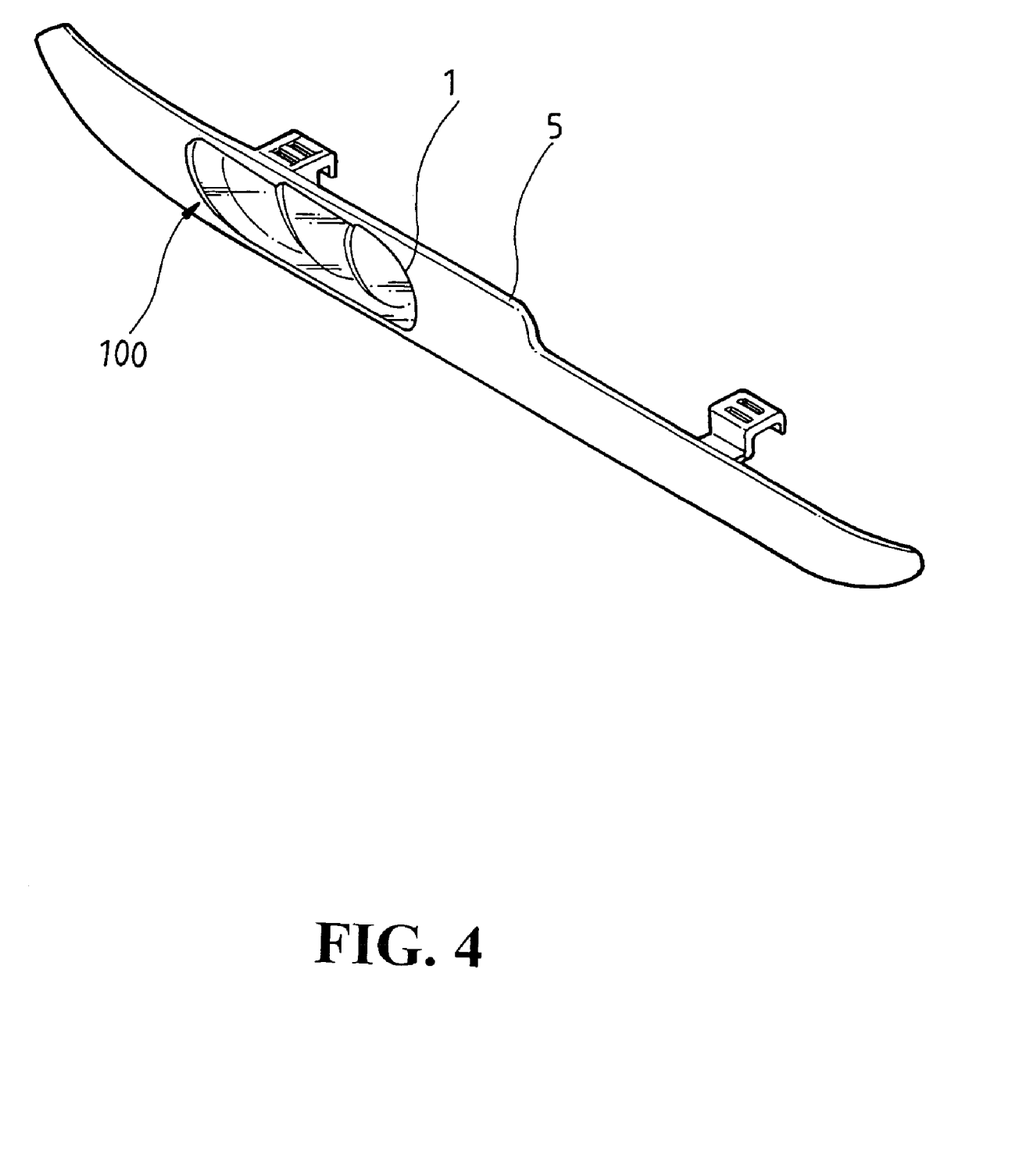
FIG. 4 is a perspective view showing that the present invention is mounted to the windshield wiper press-in plate.
Figure 5:
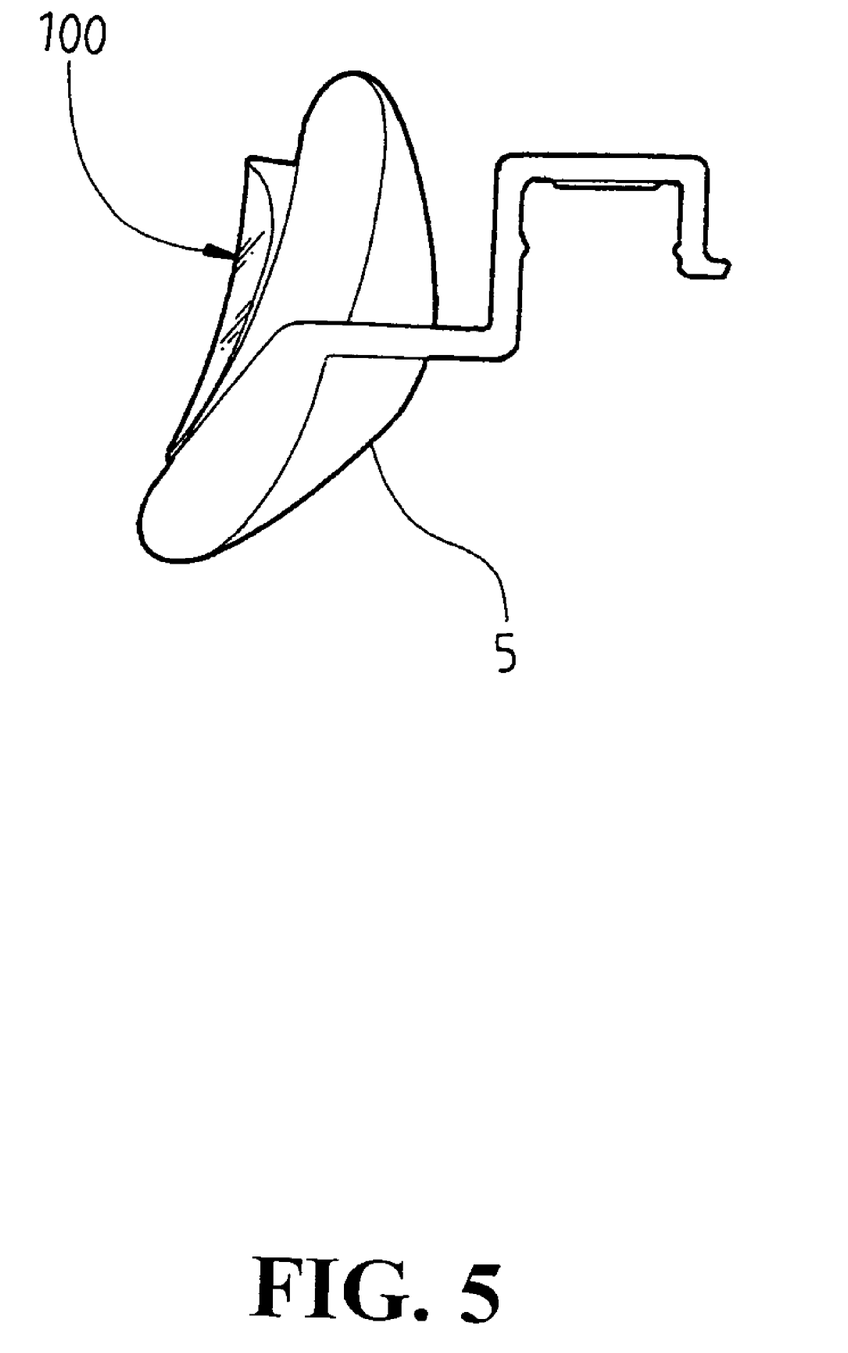
FIG. 5 is another perspective view showing that the present invention is mounted to the windshield wiper press-in plate.

When assembled, the decoration light element 100 is mounted into the opening 51 on the press-in plate 5 of the windshield wiper by having first the top 1 and the base 2 respectively mounted at where above and below the opening 51 of the press-in plate and secured with a screw 6 for the decoration light element 100 to be fixed to the press-in plate 5 as illustrated in FIGS. 4 and 5. During the night hours when the windshield wiper is activated, the LED 34 is illuminated as sensing by the light sensitive element 33 and the vibration switch. The LED 34 is set to flare at a given intermission and then automatically stop flaring after a given time to decorate the windshield wipe while improving drive safety. As the graded marks 11 on the top 1 are designed to match with the press-in plate, the spoil function of the windshield wiper will not be compromised.

Figure 6:
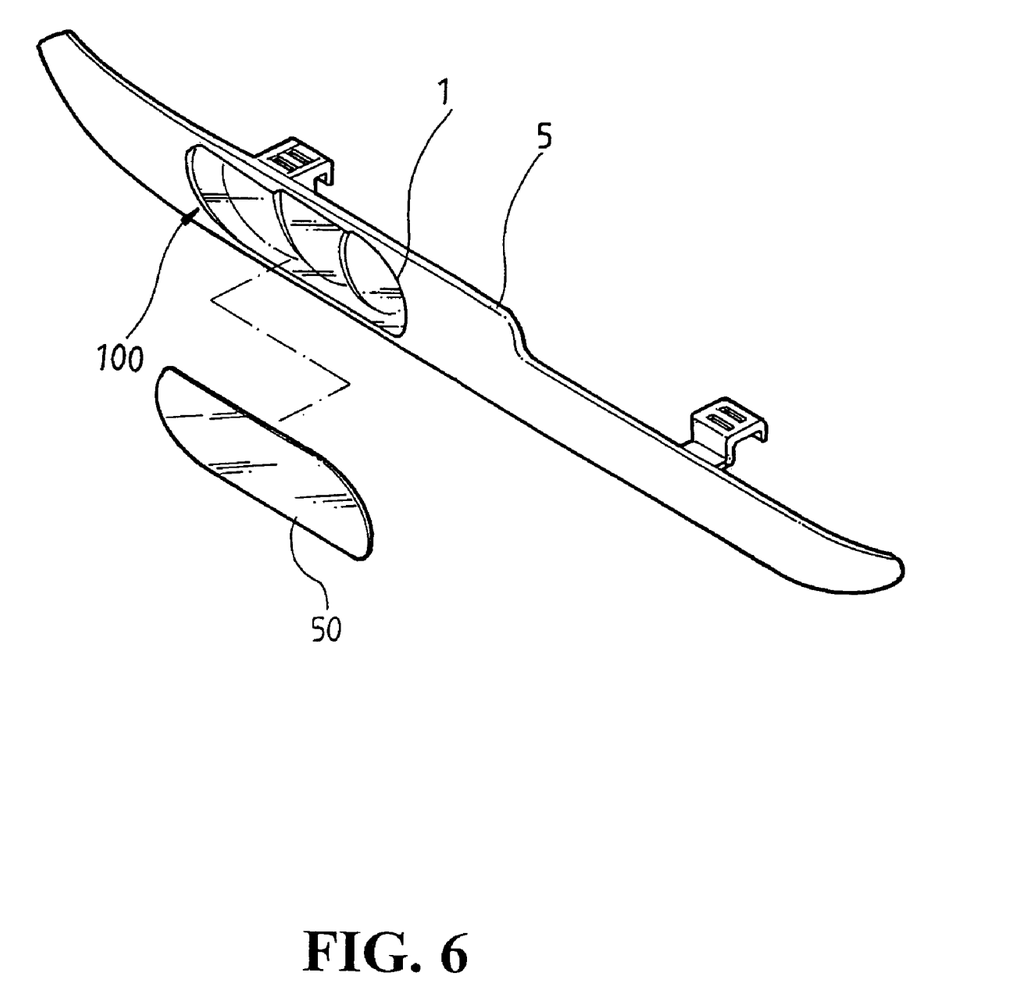
FIG. 6 is a schematic view showing a second preferred embodiment of the present invention.

As illustrated in FIG. 6, the circuit module 3 is removed from the present invention, and a reflector sheet (or paper) 50 is adhered to the surface of the top 1 of the decoration light element 100 to achieve the same decoration and drive safety effects.

Figure 7:
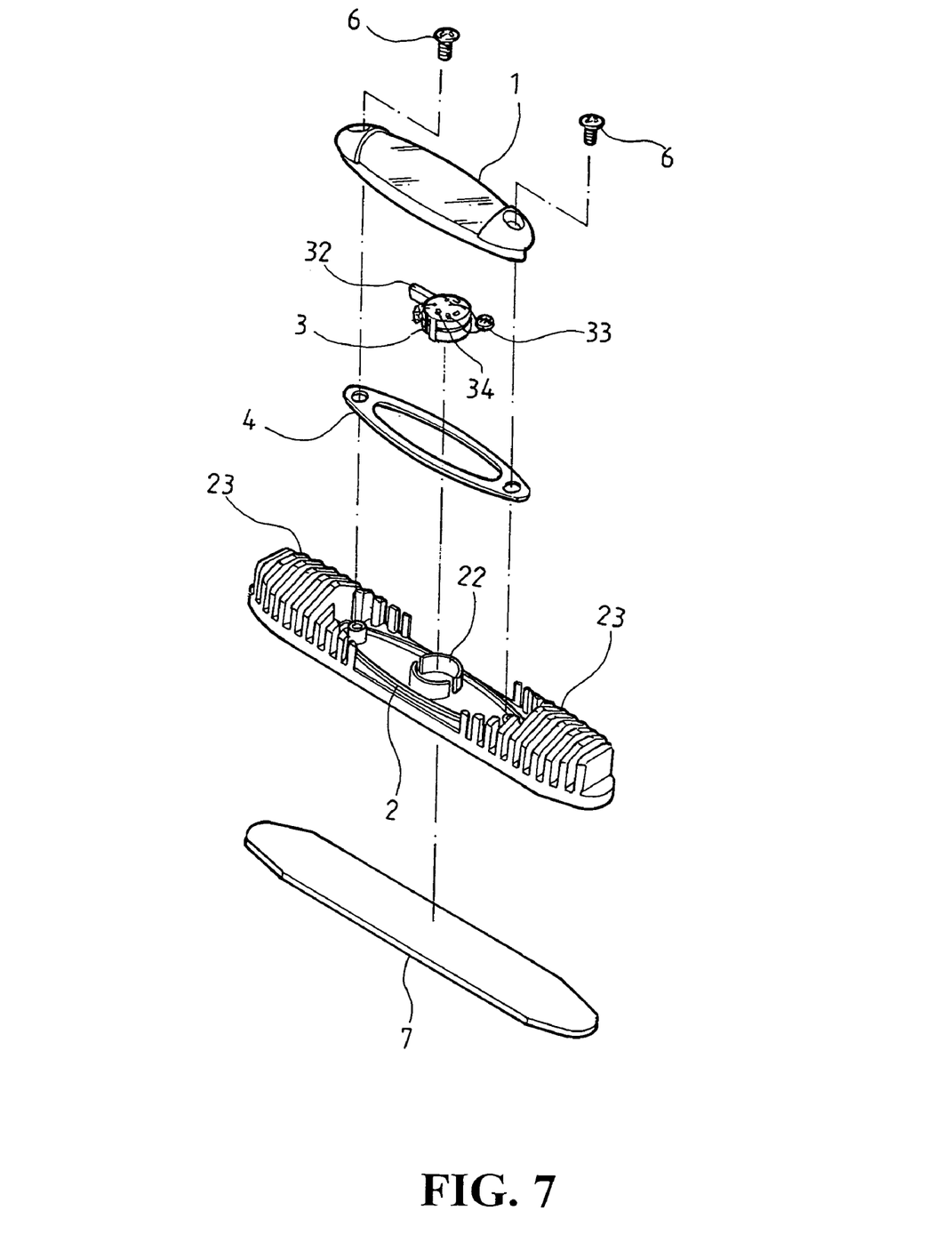
FIG. 7 is an exploded view showing the second preferred embodiment of the present invention.
Figure 8:
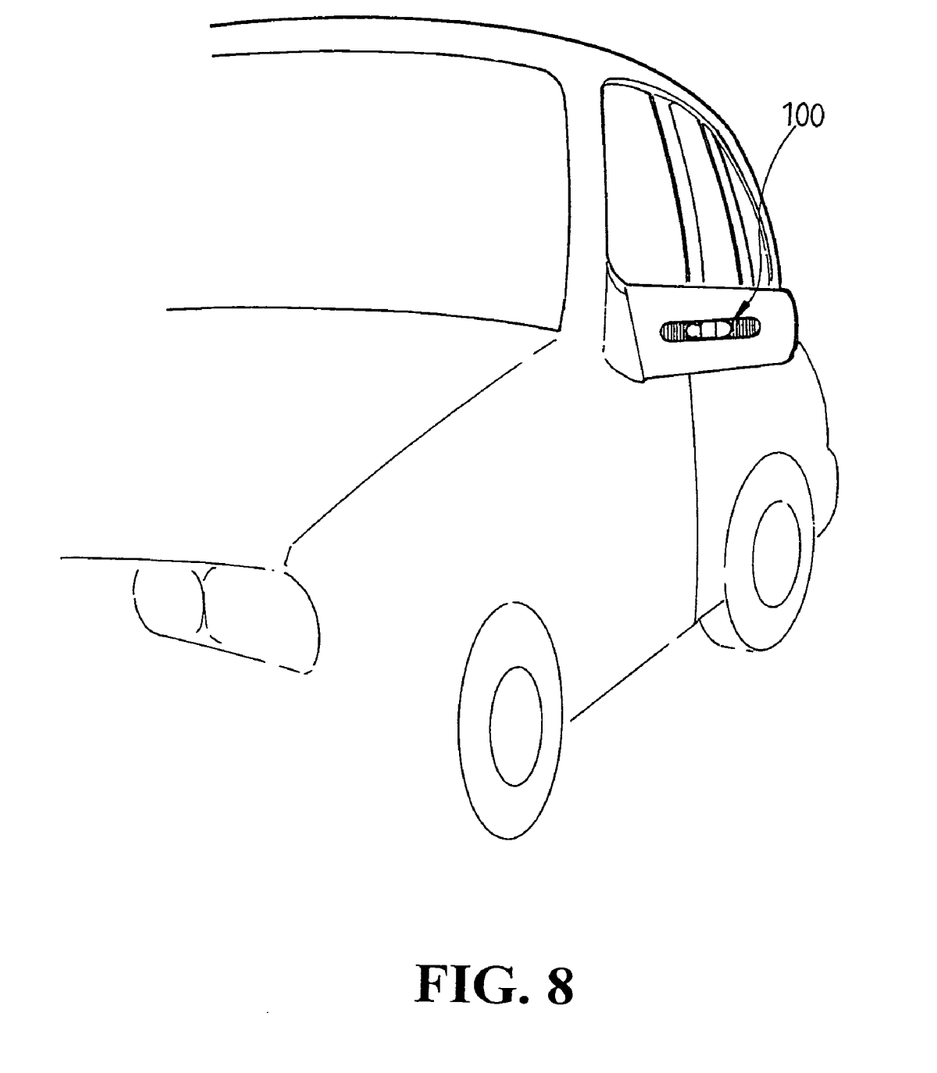
FIG. 8 is a schematic view showing an operating status of the second preferred embodiment of the present invention.

The top 1 of the present invention may be provided in different shape and both sides of the base 2 are extended as illustrated in FIG. 7. The extension of the base is disposed with multiple fins 23 to become a decoration light when the circuit module 3 is placed in the trough 22. A double-sided adhesive member 7 is applied on the back of the base 2 for the decoration light to be adhered to the rear mirror or elsewhere on the body of the vehicle as illustrated in FIG. 8.

Figure 9:
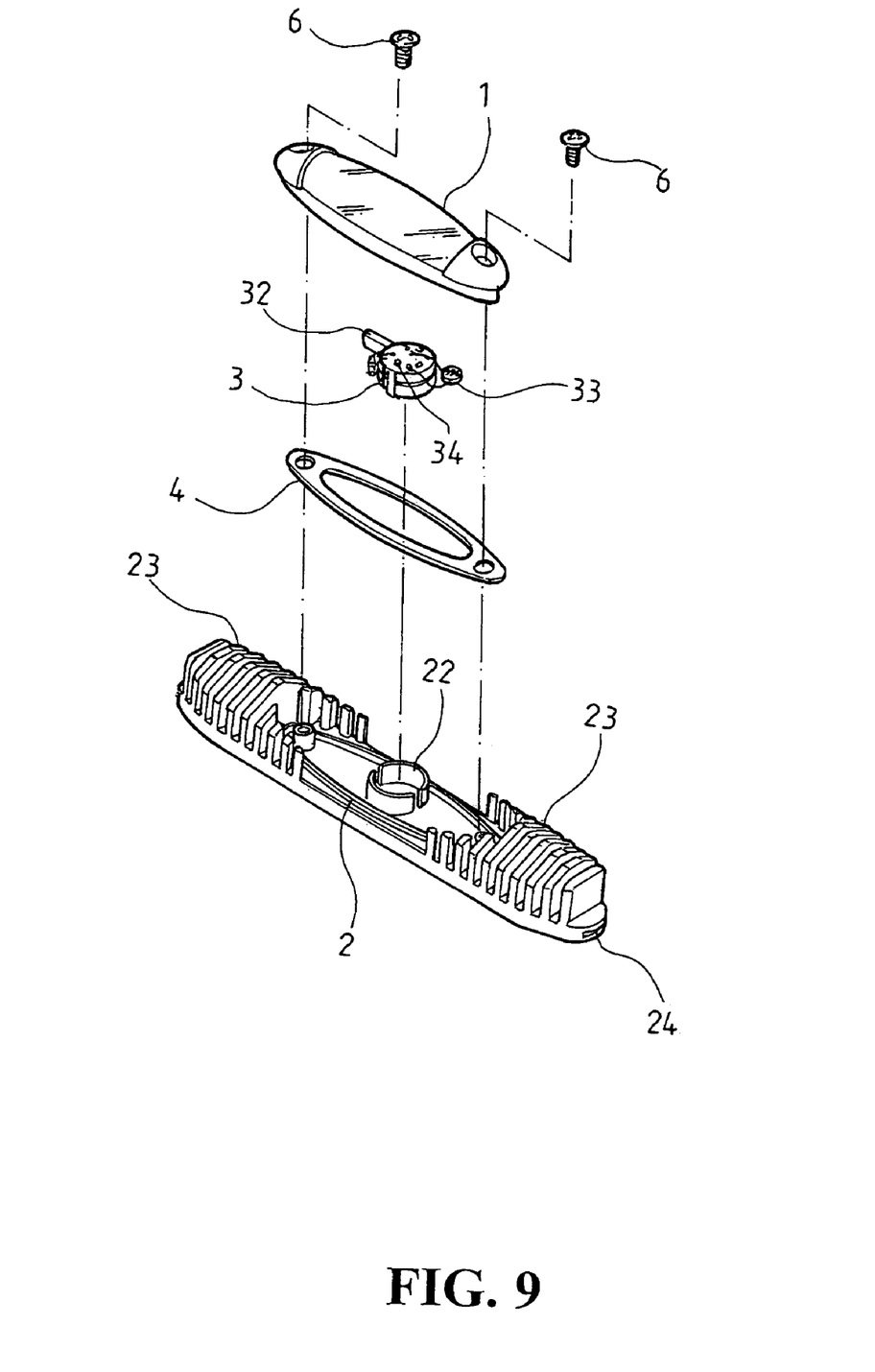
FIG. 9 is a perspective view of a third preferred embodiment of the present invention.
Figure 10:
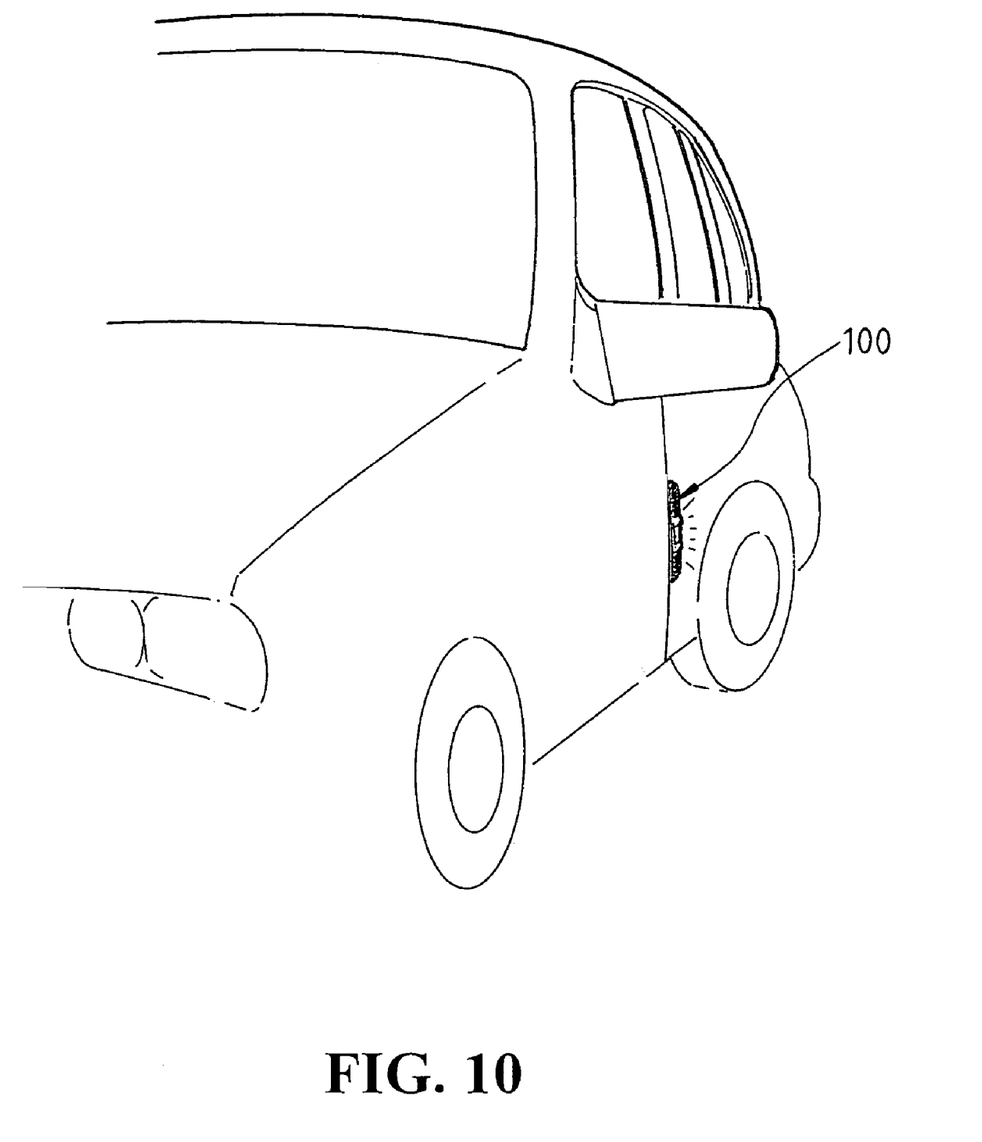
FIG. 10 is a schematic view showing an operating status of the third preferred embodiment of the present invention.

Now referring to FIG. 9, in the construction of the present invention as illustrated in FIG. 5, a curved locking tongue 24 is provided to the back of the base 2 to become another type of the decoration light to be clip on the door edge of the vehicle with the curved locking tongue. Once the LED 34 flares, the decoration light serves warning to the cars and pedestrians approaching sideways so to further improve drive safety as illustrated in FIG. 10.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A decoration light for a windshield wiper comprising:
    a windshield wiper press-in plate adapted to be mounted on said windshield wiper, said windshield wiper press-in plate having an elongated opening, said windshield wiper press-in plate having a top side and a bottom side;
    a base mounted on said bottom side of said windshield wiper press-in plate, said base having two through holes at two ends of said base and a trough at a center of said base;
    a coil fitted in said trough of said base;
    a circuit module fitted in said trough and arranged on said coil, said circuit module having an IC, a vibration switch electrically connected to said IC, a light sensitive element electrically connected to said IC, and a plurality of light-emitting diodes of different colors electrically connected to said IC, said light-emitting diodes being lighted as inducted by said light sensitive element and said vibration switch when said windshield wiper is activated during night hours, said light-emitting diodes being set to flare at a given intermission and then automatically stop flaring after a given time to decorate said windshield wiper;
    a waterproof rubber strip mounted between said base and said bottom of said windshield wiper press-in plate;
    a top having two fixation studs at two ends of said top, said top being mounted on a top side of said windshield wiper press-in plate with said two fixation studs extending through said waterproof rubber strip into said two through holes of said base; and
    two screws extending through said two trough holes of said base to engage with said fixation studs of said top.

2. The decoration light as claimed in claim 1, wherein said base is provided with a plurality of fins.

3. The decoration light as claimed in claim 1, wherein a reflector paper is adhere to a surface of said top.

4. The decoration light as claimed in claim 1, wherein said base is provided wit a double-sided adhesive member.

* * * * *